United States Patent [19]
Bruns et al.

[11] Patent Number: 5,872,319
[45] Date of Patent: Feb. 16, 1999

[54] HELICAL LOAD CELL

[75] Inventors: Robert W. Bruns; Greg E. Schindler, both of Sacramento, Calif.

[73] Assignee: GageTek Company, Rancho Cordova, Calif.

[21] Appl. No.: 845,508

[22] Filed: Apr. 24, 1997

Related U.S. Application Data

[63] Continuation-in-part of Ser. No. 795,593, Feb. 4, 1997, Pat. No. 5,714,695.

[51] Int. Cl.$^6$ ........................................................ G01L 1/04
[52] U.S. Cl. ........................................................ 73/862.641
[58] Field of Search ........................ 73/862.641, 862.636

[56] References Cited

U.S. PATENT DOCUMENTS

| | | | |
|---|---|---|---|
| 2,582,886 | 1/1952 | Ruge | 73/141 |
| 2,813,709 | 11/1957 | Brier | 265/42 |
| 4,212,360 | 7/1980 | Chesher | 177/139 |
| 5,220,971 | 6/1993 | Farr | 177/229 |
| 5,461,933 | 10/1995 | Ives et al. | 73/862.623 |
| 5,714,695 | 2/1998 | Bruns | 73/862.641 |

OTHER PUBLICATIONS

LaVar Clegg, "Bonded Foil Strain Gauge Force Tranducers", *Sensors*, pp. 68–75 (Oct. 1996).
Product brochure for "Compression Only / Thru Hole Load Washer".

*Primary Examiner*—Richard Chilcot
*Assistant Examiner*—Jewel V. Thompson
*Attorney, Agent, or Firm*—Thomas Schneck; George B.F. Yee

[57] ABSTRACT

A helical load cell includes a first pair of transducers disposed along a neutral axis of a helical coil. A second pair of transducers is disposed in diametrically opposed relation to the first pair. Sensitivity to side loading is eliminated by "splitting" the second pair of transducers. In another embodiment, each of the transducers in each pair are respectively oriented parallel and perpendicular to a neutral axis of the coil. This configuration provides a measure of torsional forces.

20 Claims, 12 Drawing Sheets

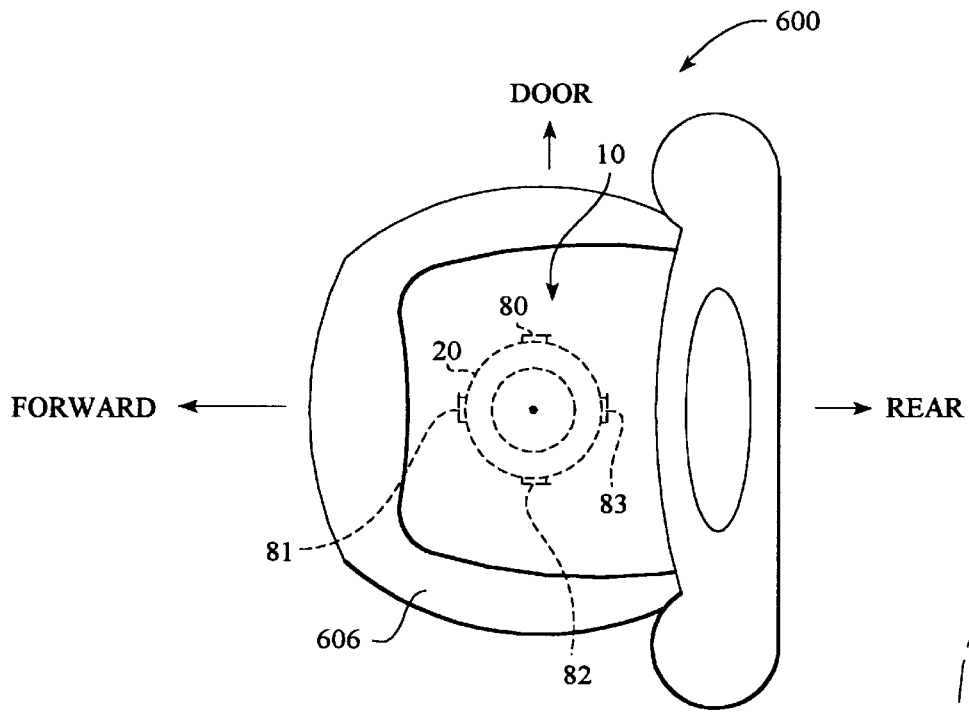
FIG. 10B
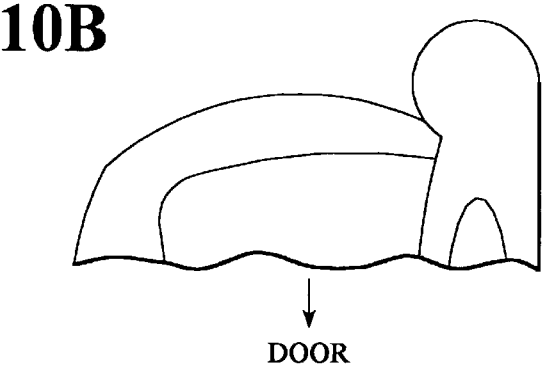
FIG. 10A
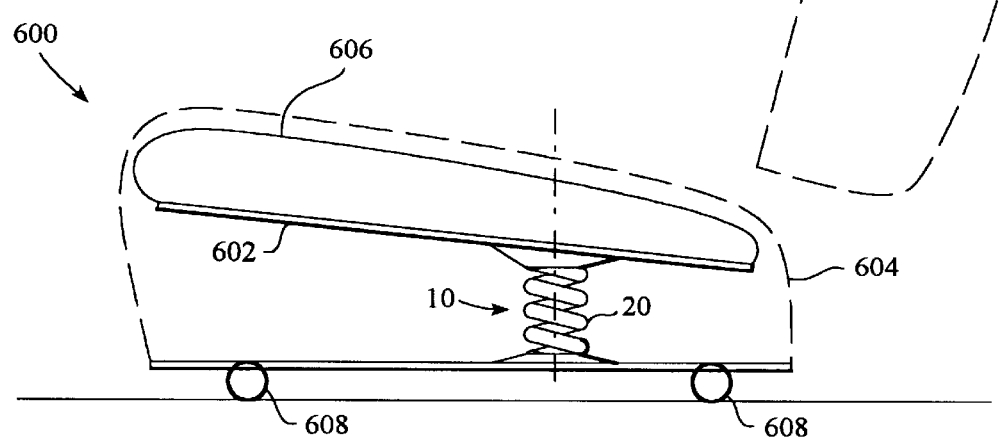

HELICAL LOAD CELL

CROSS-REFERENCE TO RELATED APPLICATION

This is a continuation-in-part of pending application Ser. No. 08/795,593, filed Feb. 4, 1997, now U.S. Pat. No. 5,714,695.

TECHNICAL FIELD

The present invention relates generally to load cells, and more specifically to a load cell which is insensitive to the position of the loading force.

BACKGROUND ART

Load cells are used to provide accurate measurements of compressive or tensile forces. Typically, the force creates a strain in the load cell which is measured by strain gage transducers. Accurate measurements, however, require that the force be applied along an axis which is central to the load cell and about which all the transducers are symmetrically placed.

An example of such a load cell which is sensitive to the effects of off-axis loading is known as a compression washer. U.S. Pat. No. 4,212,360 discloses such a load cell (FIGS. 4a and 4b), an example of which is shown in a product brochure entitled "Compression Only/Thru Hole Load Washer". As the name implies, this type of load cell is configured as a washer so that it can be mounted by securing a bolt through the device.

Other compressive load cells which are less sensitive to off-axis loading are characterized by several types. One such load cell employs a shear web design disclosed in U.S. Pat. No. 5,461,933. This design consists of a pair of concentric rings joined by two or more web members. Transducer elements disposed on the webs provide compression and tension force measurements. Although this design reduces sensitivity to off-axis loads, the web assembly must be accurately machined to tight tolerances. In addition, the traducers must be carefully bonded to the walls of the webs in a symmetrical manner in order to ensure accuracy in the measurements.

A ball and socket assembly design serves to maintain the loading force along the principle axis and exactly centered on the load cell. Such a design is shown in Photo 2 in the article by Clegg entitled "Bonded Foil Strain Gauge Force Transducers", *Sensors*, October 1996, pp. 68–75. As can be seen from the photograph, the manufacture of such a device is can be quite expensive.

A shear beam load cell, such as the one disclosed in U.S. Pat. No. 5,220,971, can be also be used in tension and compression applications. The transducer elements are diagonally placed on a machined web in the center portion of the device and measure the shear force of the applied load. Such devices are expensive to machine and accurate measurements depend on consistently centered and axially constrained forces.

In patent application Ser. No. 08/795,593 owned by the owner of the present invention and incorporated herein by reference, a helical coil load cell is disclosed which addresses the shortcomings of the described prior art load cells. The helical load cell, however, exhibits sensitivity to side-loading and torsional loads. For example, a load that is applied along a line that is not parallel to the central axis of the helical coil, presents a horizontal force component known as a side load. In addition to the side loading force, a torsion load is produced in the presence of forces which tend to "unwind" or "close down" the coil. It is desirable, therefore, to provide an improved helical load cell which is insensitive to such side loading and torsional loading forces.

SUMMARY OF THE INVENTION

The present invention is comprised of a helical coil of wire which serves to bear an axial load, either a compressive force or a tensile force. The helical coil includes two strain gage modules which detect the strain caused by the applied axial load. The strain gage modules are located on the coil in diametrically opposed relation.

Each strain gage module consists of a pair transducers, each transducer in turn consisting of a plurality of grid elements. The pair of transducers are positioned about a neutral axis of the coil in order to reject any bending moment perpendicular to that axis which is produced by an off-axis load. Each pair of transducers is arranged so that when one transducer is subjected to a compressive force, the other is experiences a tensile force. Both pairs of transducers are then coupled in a Wheatstone bridge arrangement so that bending moments in the plane of the neutral axis, due to off-axis loading, are rejected.

The two transducers comprising one of the strain gages are split and are vertically aligned along pitches of the coil adjacent to that of the "unsplit" strain gage. This arrangement compensates for side loading, thus rendering the device insensitive to side load errors.

In a variation of this embodiment, the "split" configuration comprises a proximate pair of strain gage devices located on a first pitch of the coil and a strain gage device on each the adjacent pitches above and below the first pitch.

A second pair of strain gages may be provided on the coil. Each pair of transducers comprising the second pair of strain gages are arranged in parallel and orthogonal relation to the neutral axis. This arrangement provides a measure of the torsional force applied to the coil, including the magnitude of the force and the direction of rotation, clockwise or counterclockwise, of the force.

In one embodiment of the present invention, the transducers are positioned along the outside diameter of the coil. In another embodiment, the transducers are positioned along the inside diameter of the coil. In yet another embodiment, the transducers are positioned on an upper or a lower surface of the coil. In this embodiment, it is necessary that the coil never become fully compressed since doing so will result in crushing of the transducers. A compression stop member is provided to ensure that the coil does not fully compress.

In another embodiment of the invention, a low-cost version of the helical load cell comprises a first strain gage device disposed on either the outer or the inner diameter of the coil. A second strain gage device is disposed on the upper or lower surface on the same pitch as the first strain gage device and proximate thereto. The two strain gages are coupled in a subtractive bridge circuit. This configuration is less accurate than the other embodiments, but is a lower cost device due to its simpler design. This embodiment of the helical load cell is appropriate for applications where high accuracy is not needed, but where low cost is a factor.

BRIEF DESCRIPTION OF THE DRAWINGS

FIGS. 5A–5C and 6–10B illustrate typical uses of a helical load cell constructed in accordance with the present invention.

BEST MODE OF CARRYING OUT THE INVENTION

Figure 1A:
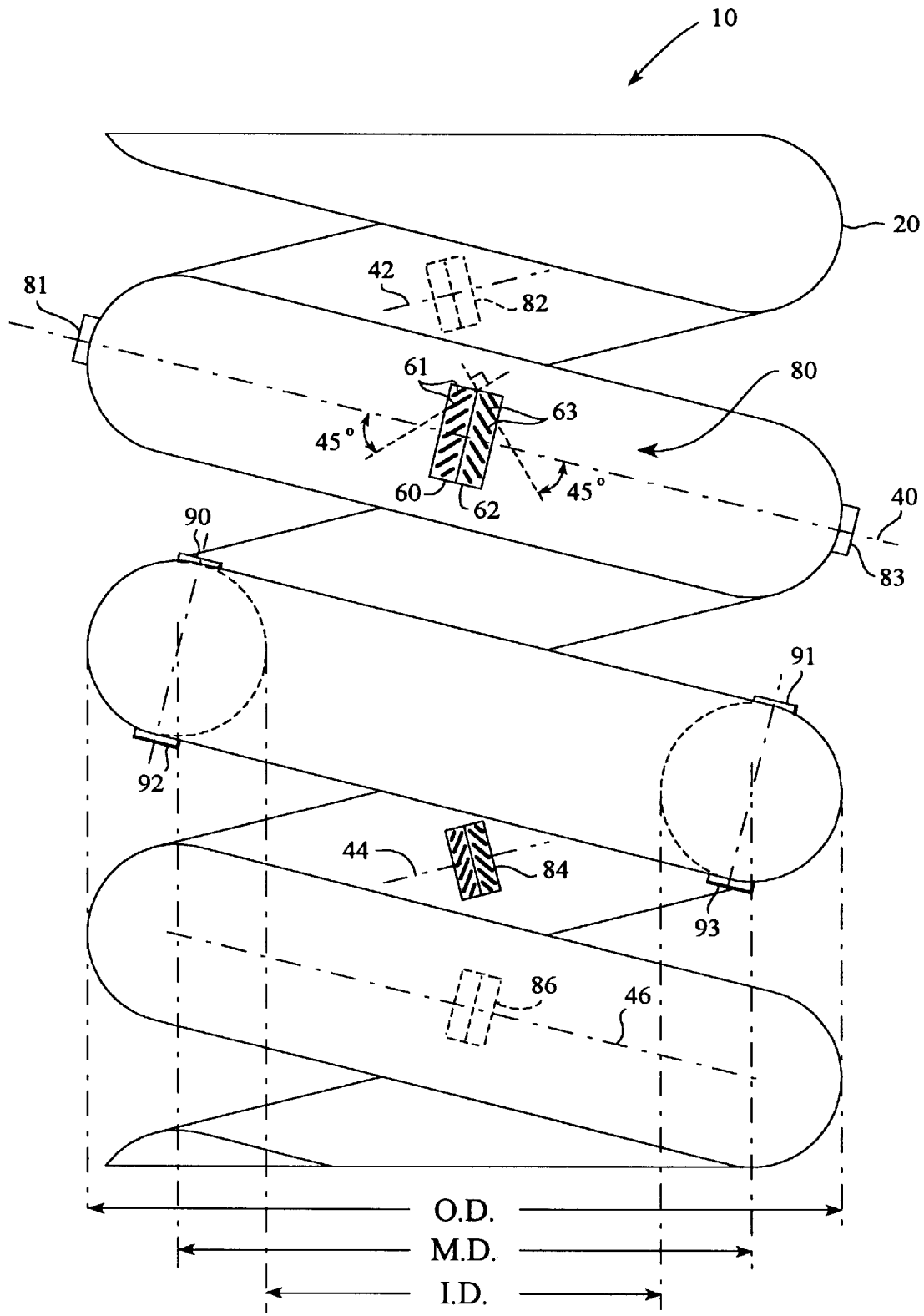
FIGS. 1A–1C and 2A–2E show a load cell constructed in accordance with the invention, illustrating the various embodiments of the invention.
Figure 1B:
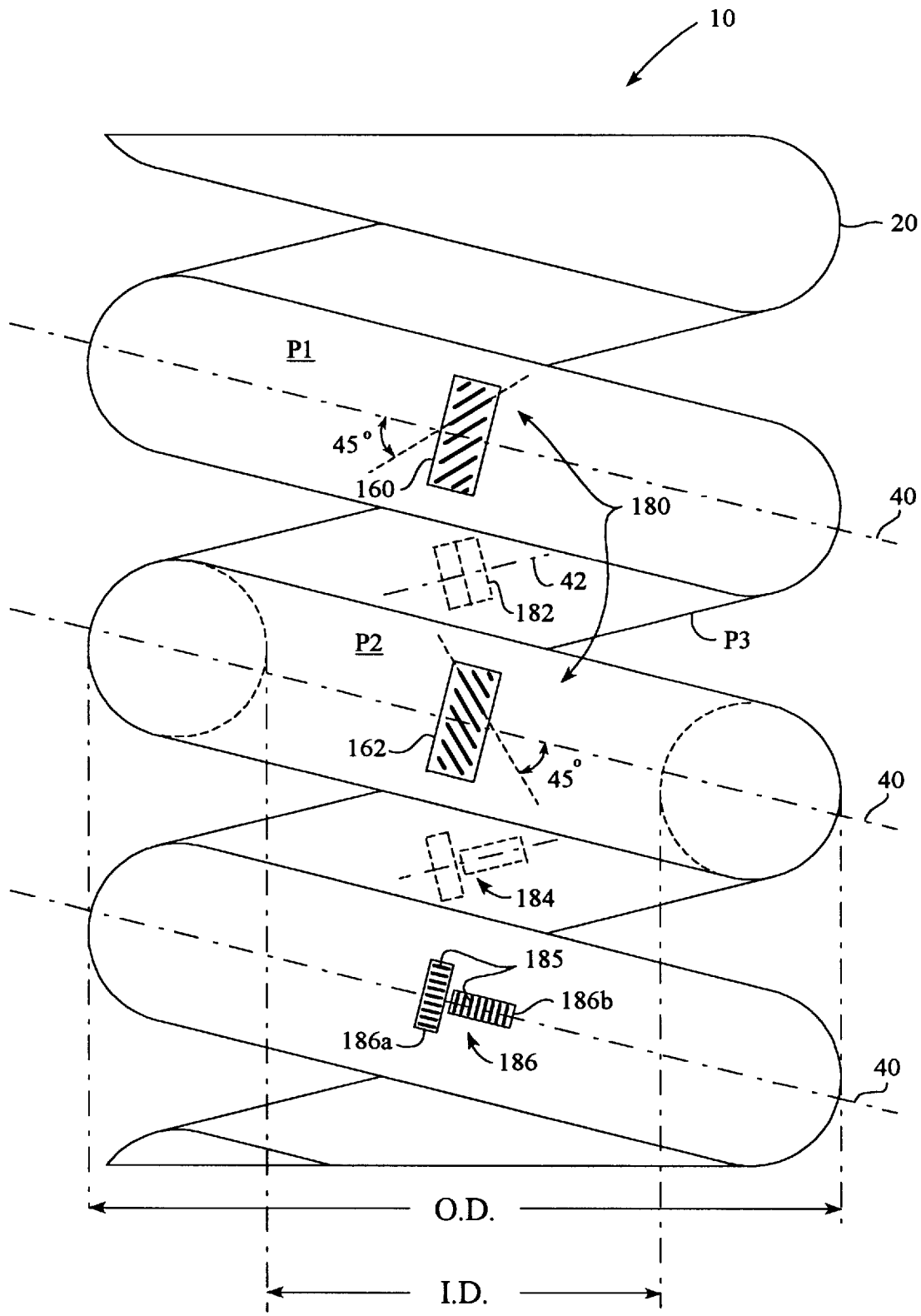
Figure 1C:
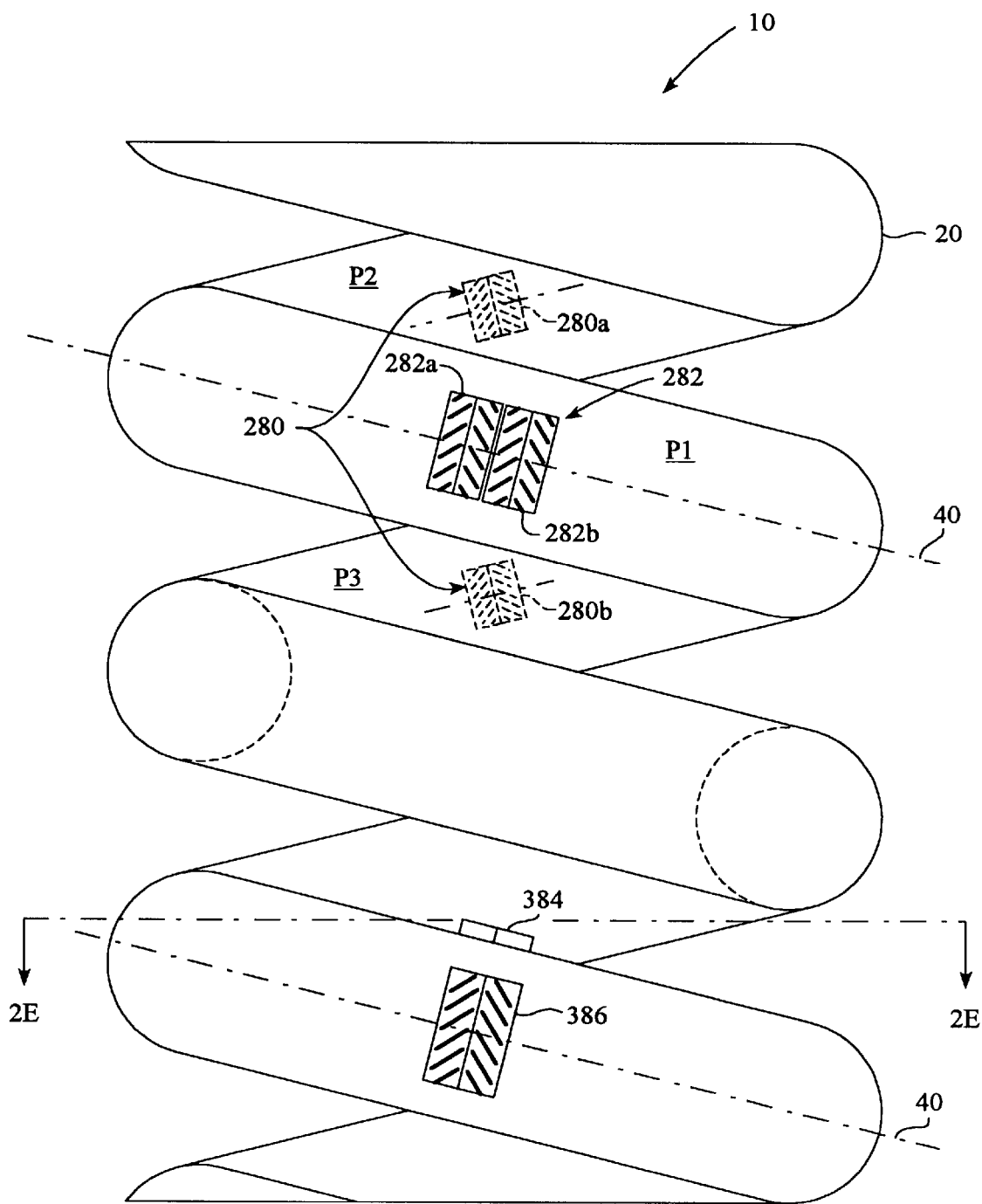

FIGS. 1A–1C show the various embodiments of the helical load cell 10 in accordance with the present invention. In FIG. 1A, a length of wire is wound to form a helical coil (a spring) 20. This is preferably done by drawing the wire through a die and winding it about a cylinder, resulting in a coil consisting of wire having a very consistent diameter along its length. Other techniques for forming springs are known in the art, however, and the specific method of forming the helical coil is not relevant to the practice of the present invention.

Figure 2A:
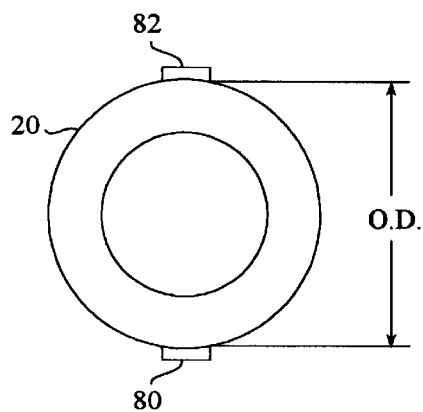

A first embodiment of the helical load cell 10 is shown in FIG. 1A with respect to strain gage modules 80, 82. Each module 80, 82 is mounted to the coil 20 along a neutral axis of the coil in a diametrically opposed relation to the other module. Strain gage module 80 is shown aligned relative to neutral axis 40, while strain gage module 82 is aligned with respect to neutral axis 42. In the first embodiment, the modules are positioned at an outside diameter of the helical coil 20. The module 82 is shown in phantom indicating that it is located at the outer periphery of the coil and opposite to module 80 along the diameter of the coil. FIG. 1A and the top view of FIG. 2A more clearly show the placement of strain gage modules 80, 82 along the outside diameter O.D. in accordance with the invention. This placement of the modules, along the outer periphery of the coil, facilitates manufacture of the invention.

A second embodiment of the helical load cell 10 is also shown in FIG. 1A with respect to strain gage modules 84, 86. As in the first embodiment, each module is mounted to the coil 20 in diametrically opposed relation to the other module. Module 84 is aligned relative to a neutral axis 44 of the helical coil 20, and module 86 is aligned along neutral axis 46. In the second embodiment, however, the modules 84, 86 are mounted along the interior diameter of the coil. Thus, module 84 is shown in solid, indicating that it is positioned along the interior surface of the coil, while module 86 is shown in phantom, being disposed upon the inside periphery of the coil at a point opposite to module 84 along the coil's inside diameter. FIG. 1A and the top view of FIG. 2B more clearly illustrate the arrangement of strain gage modules 84, 86 along the inside diameter I.D. of the coil 20.

Figure 2B:
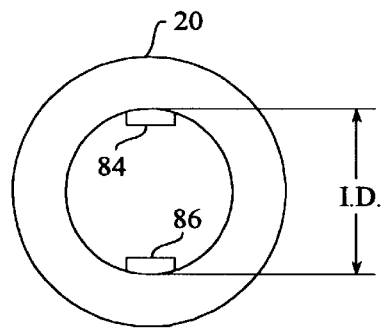
Figure 2C:
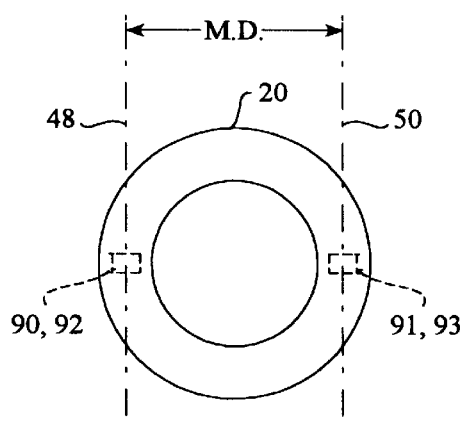

Whereas the first two embodiments of the present invention have the strain gage modules located either on the outside or inside periphery of the coil 20, a third embodiment, also shown in FIG. 1A, shows the placement of modules 90–93 either upon an upper surface of the helical coil 20 or upon a lower surface thereof. In the third embodiment, one of the strain gage modules 90, 92 is paired with one of the diametrically opposed strain gage modules 91, 93. It can be seen, therefore, that four variations of the third embodiment are possible. Thus, in one variation, the diametrically opposed modules both are located on a top surface of the coil, such as modules 90 and 91. In a second variation, the modules are positioned on a bottom surface of the helical coil 20, such as modules 92 and 93. In third and fourth variations, the diametrically opposed modules are located on opposite surfaces, such as modules 90 and 93, or modules 92 and 91. FIG. 2C shows these combinations of arrangements as seen from the top. The modules 90–93 are illustrated in phantom to indicate that they are disposed either on the upper or the lower surface of the coil 20. FIG. 1A and FIG. 2C also show that the modules 90–93 are aligned relative to their respective neutral axes 48, 50, and in diametrically opposed relation along a mean diameter M.D. of the coil.

Figure 2D:
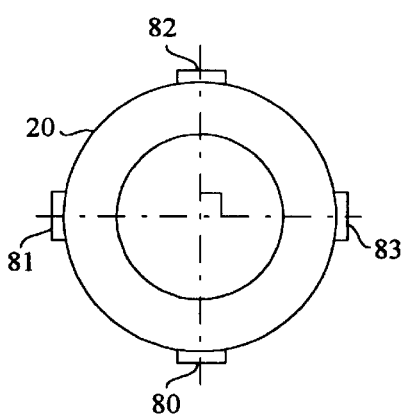

FIG. 1A illustrates yet a fourth embodiment of the invention. As will be explained below, the fourth embodiment of the load cell is capable of providing information as to the location of the applied force of an off-axis load, in addition to sensing the magnitude of that load without sensitivity to its position. Turning then to FIG. 1A, strain gage modules 80–83 are arranged as shown in accordance with the fourth embodiment. Strain gage modules 80, 82 are shown in diametrically opposed relation, as are strain gage modules 81, 83. In addition, the module pair 80/82 is shown orthogonally positioned relative to the module pair 81/83, although this is not necessary. The top view of FIG. 2D more clearly shows the arrangement of the strain gage modules 80–83 in accordance with the fourth embodiment.

Referring once again to FIG. 1A, additional detail of the strain gage modules used in each of the above-described embodiments will be discussed. Consider the strain gage module 80. As can be seen, the module 80 consists of a first transducer 60 and a second transducer 62, shown in the figure in enlarged format for clarity. Each of the transducers 60, 62 consists of a plurality of grid elements 61, 63, respectively. The grid elements are the active portion of a transducer, the resistance of which changes with an applied force. Transducer technology is a well understood art so that operation of the transducers requires no further discussion in connection to the practice of the invention.

The first transducer 60 is positioned on the helical coil 20 symmetrically about the neutral axis 40. That is, as much of the transducer 60 lies above the neutral axis 40 as does below the neutral axis. In addition, the transducer 60 is oriented so that its grid elements 61 lie at substantially forty-five degrees relative to the neutral axis. The second transducer 62 also is positioned symmetrically about the neutral axis of the helical coil 20 and proximate the first transducer. The second transducer is oriented so that its grid elements 63 lie at a forty-five degree angle relative to the axis 40 and at a ninety degree angle relative to the grid elements 61 of the first transducer 60, as shown in FIG. 1A.

Each of the strain gage modules 80–93 are constructed in a manner similar to strain gage module 80. Each module consists of two transducers aligned to their respective neutral axes and to each other as shown for module 80.

The transducers which comprise the strain gage modules of the invention may be mounted simply by gluing them to the surface of the helical coil 20 with an appropriate glue such as an epoxy compound. Alternatively, thin film transducers may be used, which are sputtered onto the surface of the coil. This method lends itself to high volume automated processes. Another type of transducer involves silicon transducers bonded to the coil. In this process, the transducers are fabricated out of silicon in wafer form, not unlike the fabrication of silicon integrated circuits. The silicon chip transducer is then bonded to the metal surface of the coil and wires are attached by wire bonding techniques similar to those used in integrated circuit manufacture. Silicon transducers are on the order of fifty times more sensitive than their metal-based counterparts. The gage factor of a transducer is defined as the ratio of the change in its resistance to the change in its length, multiplied by $1\times10^6$. For metal transducers, the gage factor is typically 2, while the gage factor for a typical silicon transducer is 100.

It is clear that any one of a number of types of transducers can be used, and any of a number of methods for mounting the devices to a coil are known. The particular device type and mounting method are dictated largely by desired performance characteristics and manufacturing costs. It is noted, therefore, that the specific type of transducer and the mounting method is not relevant to the practice of the present invention.

When attaching the transducers to the coil, the coil (spring) first is fully compressed to a solid cylinder. This pre-stresses the coil, changing the yield point so that the new yield point of the material is reached only when the coil is fully compressed. Thus, transducers mounted to the coil will not be damaged when the coil becomes fully compressed, since the material of the coil will not exceed its yield point. The transducers are mounted after the coil is pre-stressed and allowed to return to its uncoiled state. Alternatively, the transducers may be mounted to the coils when the coils are in a compressed condition. For larger coils, however, the fixtures used to compress such coils make it impractical to mount the transducers. Thus, the former method is preferred.

Compressing the coil to a solid cylinder results in a load cell that no longer measures, but is rigid and quite strong; as strong as a true cylinder with the same cross sectional area. As an example, a load cell rated at 5,000 pounds can be made from 0.625 inch diameter wire wound to a two inch diameter coil. The coil reaches a solid at about 10,000 pounds of axial force. No further measurement is possible, but the load cell is then able to withstand additional load to approximately 100,000 pounds without any damage to the transducers disposed on the coil. This is due to the fact that the yield point of the metal comprising the grid elements of the transducers, in $\mu$in/in of strain, is nearly the same as that of the material in the coil, and preloading to the solid condition assures that the strain cannot subsequently be exceeded. Prior art load cells only allow two to three times the rated load force before permanent damage occurs. A helical load cell manufactured in accordance with the present invention allows up to twenty times overload without any damage. The stops are built-in and are effectively present when the spring has been compressed to a solid.

Figure 3A:
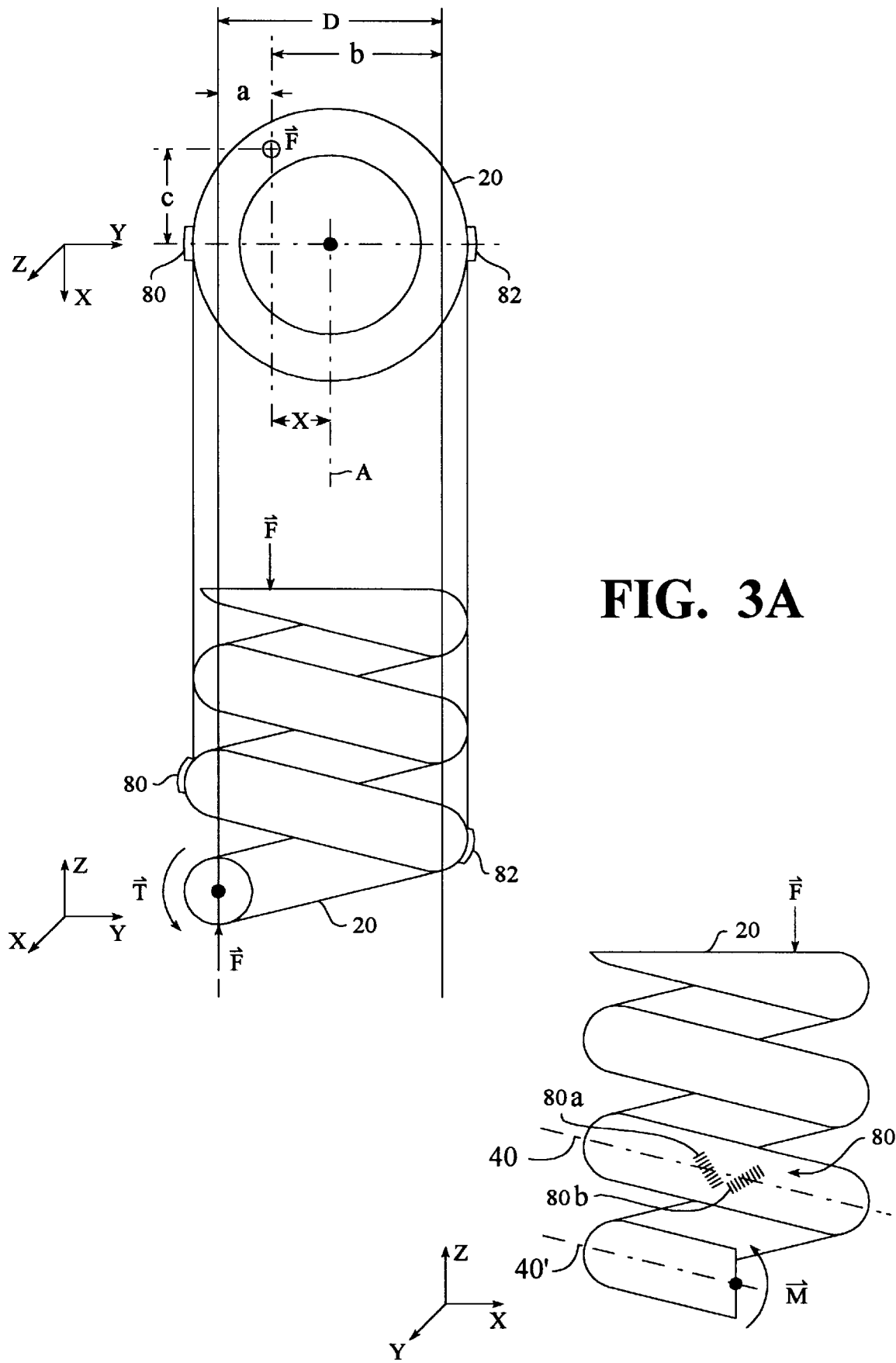
FIGS. 3A–3B are force diagrams illustrating the force vectors acting on a helical coil when off-axis and side loads are applied.

FIG. 3A shows the forces experienced by the helical coil 20 due to a load F applied at an arbitrary off-center position. Consider first, the special case wherein the loading force is applied along the central axis of the coil 20. The maximum shear stress $\tau_{max}$ experienced along the outside diameter of the coil is:

$$\tau_{max} = \frac{F}{A} - \frac{Tr}{J} \quad (1)$$

where:
- $\tau_{max}$ is the maximum shear force at the outside diameter surface of the coil,
- F is the applied force,
- A is the cross sectional area of the coil
- T is the resisting torsional force,
- r is the radius of the wire comprising the coil, and
- J is the polar area moment of inertia of the wire.

The maximum shear force experienced along the inside diameter of the coil is:

$$\tau_{max} = \frac{F}{A} + \frac{Tr}{J} \quad (2)$$

where the terms are as defined above.

Since the applied force is at the center of the coil, the torsional force, T, is equal to $$F \times \frac{D}{2},$$

where D is the mean diameter of the coil.

In the generalized case, however, the applied force may be arbitrarily located, such as shown in FIG. 3A. In this case, the torsion term $$\frac{T \times r}{J}$$

varies depending upon the location of the applied force on the coil, and thus the shear stress $\tau$ will vary. Consider the arrangement in FIG. 3A. Strain gage modules 80, 82 are positioned along the outside diameter of the helical coil 20. A loading force F is applied off-axis relative to the coil, at a-units left of center along the Y-axis and c-units off center along the X-axis.

Since the loading force is applied off-axis, a bending moment M about the Y-axis is created, as shown in FIG. 3A. Recall from the above discussion, however, that each transducer 80a, 80b of the strain gage module 80 is symmetrically aligned along a neutral axis 40 of the coil. By so doing, one half of the active grid elements are located above the axis, and the other half of the grid elements are below the axis. A bending moment M, as shown in FIG. 3A applies tension force on the elements below the axis and a compressive force on the elements above the axis. The resistance changes experienced by the grid elements above and below the axis are equal and opposite, and thus the total resistance change experienced by the entire transducer due to the bending moment M is substantially equal to zero. Therefore, the maximum shear equation needs not account for the bending moment due to an off-axis load, since the strain gage modules are not sensitive to such a force.

Continuing with FIG. 3A then, the shear force $\tau_{80}$ experienced by strain gage module 80 is:

$$\tau_{80} = \frac{F}{A} - \frac{Tr}{J} \quad (3)$$
$$= \frac{F}{A} - (Fa)\frac{r}{J}$$

where the torsion force T is F×a.

Similarly, the shear force $\tau_{82}$ experienced by the diametrically opposed strain gage module 82 is:

$$\tau_{82} = \frac{F}{A} - \frac{Tr}{J} \quad (4)$$
$$= \frac{F}{A} - (Fb)\frac{r}{J}$$

where the torsion force T is F×b.

If the outputs of the two strain gage modules are summed, then:

$$\tau_{TOTAL} = \tau_{80} + \tau_{82} \quad (5)$$
$$= \frac{2F}{A} - \frac{Fr}{J}(a+b)$$

Since (a+b) is equal to the mean diameter D of the coil 20, then:

$$\tau_{TOTAL} = \frac{2F}{A} - \frac{FrD}{J} \quad (6)$$

$$= \left(\frac{2}{A} - \frac{rD}{J}\right)F$$

$$= kF$$

Thus, the total shear $\tau_{TOTAL}$ measured by the two diametrically opposed, outside diameter strain gages 80, 82 is directly proportional to the loading force F, where the constant of proportionality k is:

$$k = \left(\frac{2}{A} - \frac{rD}{J}\right) \quad (7)$$

Since the proportionality constant k consists only of the physical parameters of the coil, the total shear $\tau_{TOTAL}$ is completely independent of the position of the load. Thus, loading anywhere along the top surface of the coil produces the same $\tau_{TOTAL}$. Moreover, a loading force applied outside the diameter of the coil will result in the same $\tau_{TOTAL}$ irrespective of the location of the load. This can be shown by a similar analytical treatment of the applied load and the forces resulting therefrom.

Recall from Eq. (2) that the inside shear is computed by the addition of the force terms, resulting in a greater range of measurable shear force. Because of the increased dynamic range, the inside diameter strain gage modules 84, 86 shown in FIG. 1A are more sensitive to loading forces than are the outside diameter mounted modules. However, placement of transducers along the inside periphery of the coil is more difficult to achieve and in some applications may subject the transducers to risk of damage, as will be explained below. Nonetheless, inside diameter modules may be applicable under certain conditions and certainly fall within the scope of embodiments contemplated for the present invention.

It is further noted, in connection with the embodiments of the invention involving the surface mounted strain gages 90–93 shown in FIG. 1A, that the transducers thereof are not subject to the direct shear component, namely F/A, leaving only the torsional shear to be measured. A shortcoming of this embodiment of the invention, applicable to all four variations, is that positioning of the transducers on the upper or lower surface of the coil subjects them to damage when the coil is fully compressed to a solid, i.e. with no gaps between the wires.

Referring again to FIG. 3A and to Eqs. 3 and 4, if the difference between the measured shear forces $\tau_{80}$ and $\tau_{82}$ is computed, then:

$$\tau_{DIFF} = \tau_{80} - \tau_{82} \quad (8)$$

$$= -(Fa)\frac{r}{J} + (Fb)\frac{r}{J}$$

$$= \frac{Fr}{J}(b-a), (b-a) = 2x$$

$$= k_1 Fx, k_1 = \frac{2r}{J}$$

Thus, the difference $\tau_{DIFF}$ reflects the distance x from the centerline A of the coil 20 to the applied load force.

As shown in FIG. 3A, the distance x measured by the strain gage modules 80, 82 is the distance between the centerline of the coil and a line which is perpendicular to the line between the modules and which passes through the applied force F. It can be seen from Eqs. 6 and 8, therefore, that a helical load coil can be constructed which is both insensitive to off-axis loads and capable of providing information as to the location of such loads with respect to the distance from the centerline of the coil.

Returning to FIG. 1A then, such a configuration is shown with respect to strain gages 80–83. As will be explained below, strain gages 80 and 82 which provide force measurements that are independent of the location of the load are coupled in a conventional bridge configuration. Strain gages 81 and 83 are coupled in a modified bridge circuit to provide a signal that is a function of the distance of the loading force from the centerline of the coil.

Figure 4A:
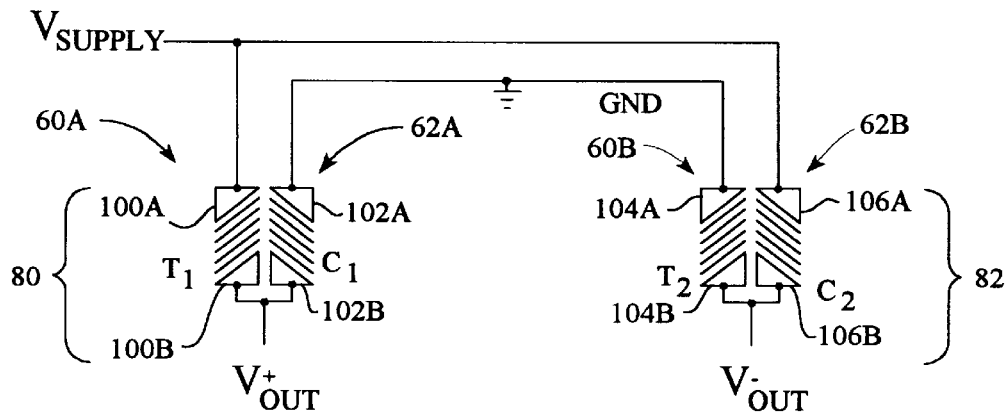
FIGS. 4A–4D are schematic diagrams of transducer bridge configurations.
Figure 4A:
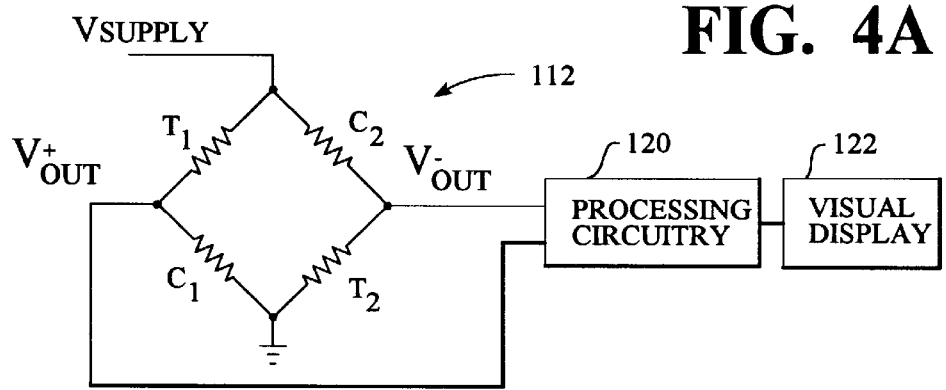
Figure 4B:
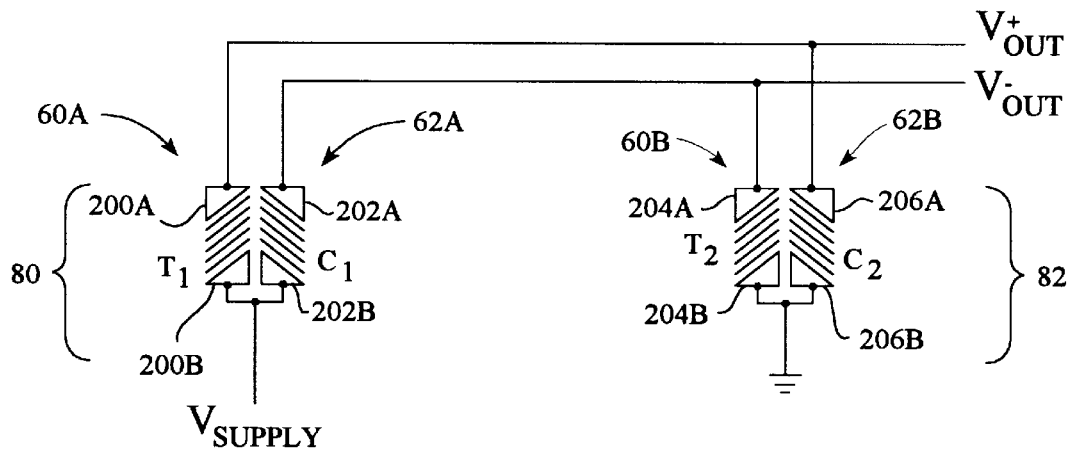
Figure 4B:
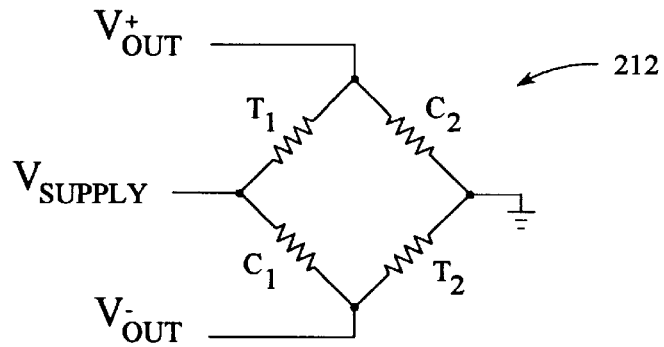
Figure 4C:
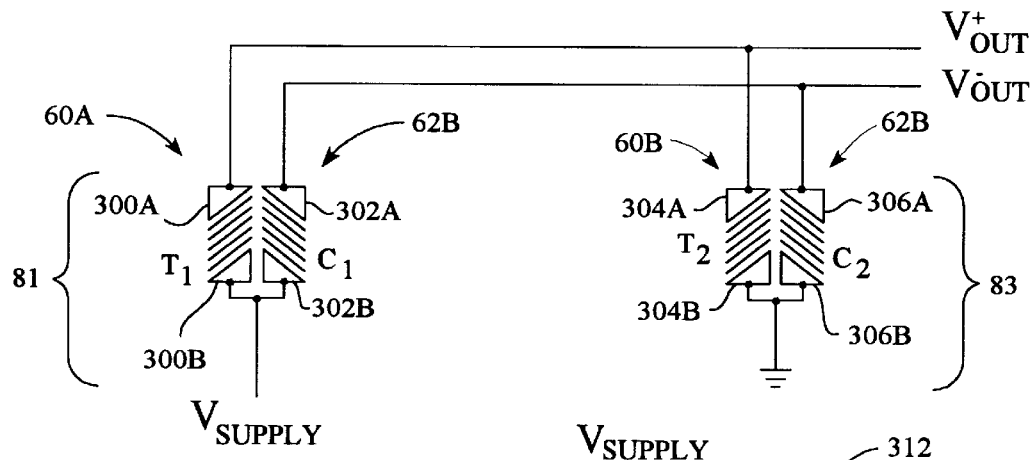

Turning now to FIGS. 4A–4C, the bridge circuits used to connect the strain gage modules will now be described. Although the figures are illustrated using the outside diameter-mounted strain gage modules 80, 82, the same bridge circuitry is applicable to the second and third embodiments, namely the inside diameter-mounted modules 84, 86 and the top/bottom surface-mounted modules 90–93, all as shown in FIG. 1A.

Referring to the strain gage modules 80, 82 shown in FIG. 4A, recall that the transducers in each of the transducer pairs 60A/62A and 60B/62B, respectively comprising the two modules, are orthogonally oriented relative to each other. As such, when one transducer, say 60A, is subject to a compressive force the other transducer, 62A is subject to an equal and opposite tensile force. This is represented in FIGS. 4A and 4B by the T and C reference letters. The particular transducers which are in tension, however, will depend upon whether the coil is in tension or compression and whether the coil has been wound in a right or left hand sense.

FIG. 4A shows a first bridge circuit arrangement wherein the oppositely stressed transducers of each of the modules are coupled together. Thus, an end 100A and 106A of each of transducers 60A and 62B are coupled together and in turn coupled to a voltage supply, and an end 102A and 104A of each of transducers 62A and 60B are coupled together and in turn coupled to ground. The remaining ends 100B, 102B of transducers 60A, 62A are coupled together and serve as a $V^+_{out}$ output reference. Similarly, two ends 104B, 106B of transducers 60B, 62B are coupled together and serve as a $V^-_{out}$ output reference. The circuit diagram 112 of FIG. 4A shows that the interconnections form a traditional Wheatstone bridge, where the resistive elements represent the transducers 60A–62B.

FIG. 4B shows a second bridge circuit arrangement. The interconnections among the transducers 60A–62B are identical to those shown in FIG. 4A. However, the voltage supply and ground connections are interchanged with the $V^+_{out}$ and $V^-_{out}$ connections. The accompanying circuit diagram 212 illustrates the resulting bridge circuit.

In both of the above bridge circuits 112, 212, similarly stressed transducers are coupled as opposing arms of the bridge; thus, the $T_1$ and $T_2$ transducers are on opposite arms of the bridge, as are the $C_1$ and $C_2$ transducers. The circuits 112, 212 are common bridge configurations for effectively summing together the transducer outputs. These circuits therefore each produces a signal indicative of the sum of the detected shear forces in accordance with Eq. 6.

The bridge outputs $V^+_{out}$, $V^-_{out}$ are fed into processing circuitry 120. In the preferred embodiment, the processing circuitry is a differential amplifier wherein its differential inputs receive the bridge outputs. The output of the differential amplifier can then be digitized to drive a visual display 122 to provide a digital readout.

Turn now to FIG. 4C for a description of a bridge circuit used in the fourth embodiment of the present invention. Recall that this embodiment involves the use of four strain gage modules 80–83 arranged on the helical coil as illustrated in FIG. 1A. Strain gage modules 80, 82 are coupled in an additive manner utilizing a conventional bridge circuit, such as those shown in FIGS. 4A and 4B. Strain gage modules 81, 83, however, are coupled in a modified bridge circuit.

Such a circuit is shown in FIG. 4C. The similarly stressed transducers 60A, 60B of the respective modules 81, 83 are coupled together and provide $V^+_{out}$, as are transducers 62A, 62B which provide $V^-_{out}$. In addition, terminals 300B, 302B of transducers 60A, 62A are coupled to $V_{supply}$, while terminals 304B, 306B of transducers 60B, 62B are coupled to ground. The equivalent circuit is shown by circuit diagram 312.

It can be seen that the similarly stressed transducers of each module 81, 83 are coupled as adjacent arms of the bridge; thus $T_1$ and $T_2$ form adjacent arms, and $C_1$ and $C_2$ form adjacent arms. In this circuit arrangement, the transducer outputs are combined in a subtractive manner.

A peculiar aspect of the subtractive bridge circuit 312 is that it does not sense the presence of on-axis loads. In the presence of an on-axis load, the strain gage modules 81, 83 are subject to the same loading force; thus $T_1$ and $T_2$ will change by the same amount, and $C_1$ and $C_2$ will change by the same amount. The differential output $V^+_{out}$, $V^-_{out}$ will therefore remain unchanged. Thus, if the circuit is null-balanced when there is no load, i.e. the differential output is zero volts, the circuit will remain balanced in the presence of an on-axis load. This is consistent with Eq. 8 (and FIG. 3A) where x=0 for an on-axis load.

Thus, a helical load cell constructed in accordance with the above-described fourth embodiment, provides: (1) a signal proportional to the loading force F, irrespective of its location, produced by strain gage modules 80, 82; and (2) a signal proportional to the loading force times the distance of the force from the centerline of the coil, produced by strain gage modules 81, 83. Eqs. 6 and 8 show that these two signals are readily combined to derive the location x of an off-axis load, while at the same time providing an accurate measurement of the load irrespective of its location.

A few additional observations are provided in connection with the subtractively coupled strain gages; e.g. 81, 83 shown in FIG. 1A. First, although FIG. 1A shows the second pair of strain gage modules 81, 83 to be mounted in a fashion as to be perpendicular to the first pair of strain gage modules, this is not necessary. As already noted above, the second pair of modules may be positioned at any angle relative to the first pair of modules.

Second, FIG. 1A shows the second pair of modules 81, 83 to be mounted along the outside diameter O.D. of the coil 20. It is noted that the modules may be mounted along the inside diameter I.D. of the coil as well. The operation of the invention is unaffected whether both pairs of strain gages are mounted along the outside diameter, along the inside diameter, or whether one pair is mounted on the outside diameter and the other pair is mounted on the inside diameter.

Third, it is observed that another pair of strain gage modules (not shown) can be utilized in a subtractive manner to obtain the location of the center of gravity of the applied load. Recall that a subtractively coupled pair of modules, such as modules 81, 83, provides a force measurement that is a function of the distance between the centerline of the coil and a line which is perpendicular to the line between the modules and which passes through the applied force (see FIG. 3A). Thus, if two pairs of strain gage modules are mounted to the coil, each pair arranged orthogonal to the other pair and each pair coupled as a subtractive bridge circuit, then X and Y locations (of a plane defined by the two pairs of strain gage modules) of the center of gravity of the applied load can be computed and the location of the center of gravity determined.

Referring now to FIG. 1B, an alternate configuration of the helical load cell is shown. The arrangement of strain gage modules 180, 182 exhibits the property of being insensitive to side loading as well as off axis loads. The foregoing discussions in connection with the embodiments of FIG. 1A apply in the arrangement illustrated by strain gage modules 180, 182 shown in FIG. 1B. In this embodiment, one of the strain gages 180 is shown in a "split" configuration, wherein transducer elements 160, 162 comprising module 180 are split across separate pitches P1, P2 of the coil 20. Gage 182 is positioned on a pitch P3 of the coil such that it is equidistant in the vertical direction between transducer elements 160 and 162 of gage 180. As with the embodiments shown in FIG. 1A, the "split" configuration can be arranged along the outside diameter of the coil 20 as shown in FIG. 1B, or along the inside diameter of the coil 20 in the manner indicated in FIG. 2B.

Figure 3B:
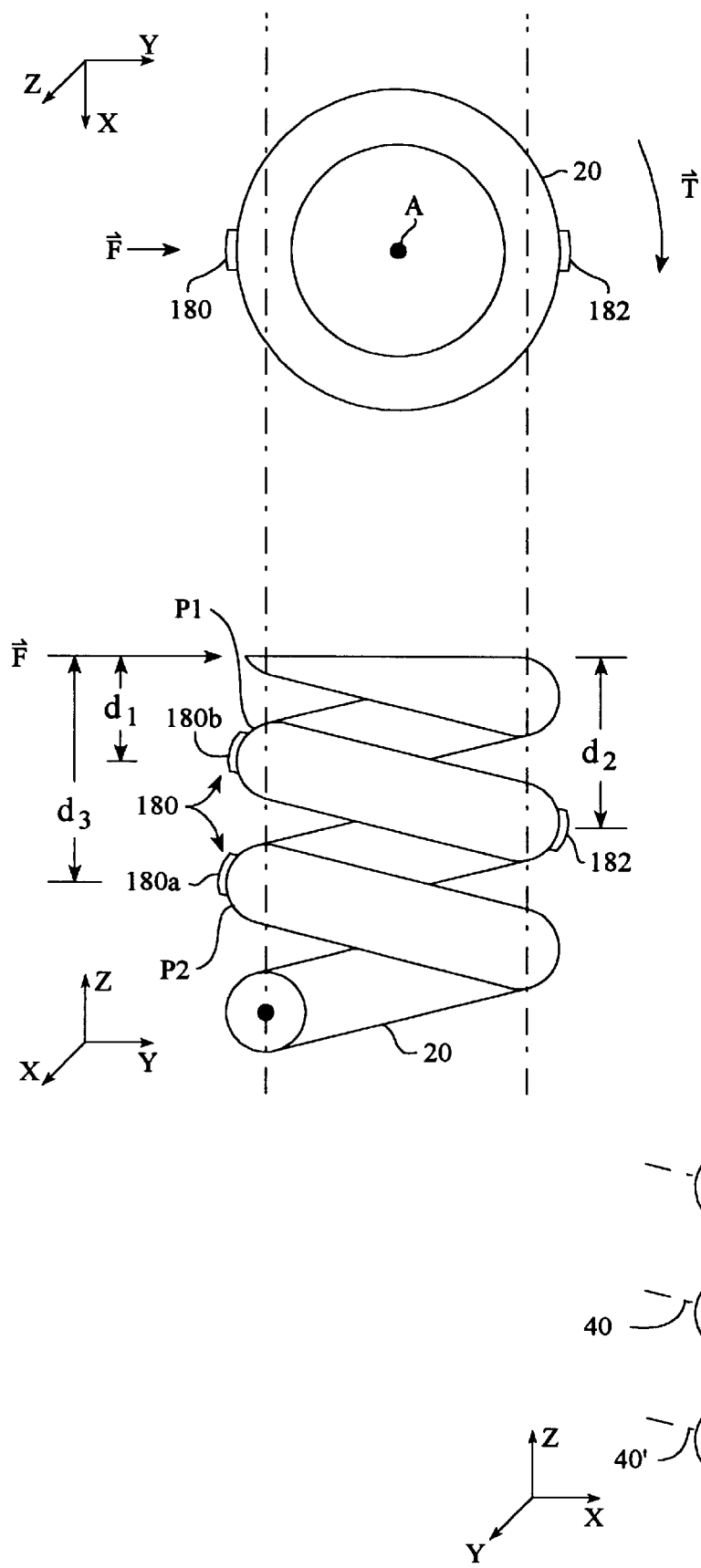

The force diagram shown in FIG. 3B shows a side load F applied to the coil 20. The coil contains strain gage 182 and a "split" strain gage 180 disposed diametrically opposite the former. The transducers 180a, 180b of the split gage are disposed on separate pitches P1, P2 of the coil 20. The strain gage 182 is located between transducers 180a and 180b such that gage 182 is equidistant from transducers 180a and 180b in the vertical direction.

The torsional reaction at gage 182 is $T_{182}=F\times d_2$. The torsional reaction at gage 180b is $T_{108b}=F\times d_1$; similarly, the torsional reaction at gage 180a is $T_{180A}=F\times d_3$. Recall that each of the transducers comprising a strain gage are subjected to opposite forces: when one of the transducers is in compression, the other is in tension. This remains true in the split configuration of strain gage 180 in FIG. 3B. In this case, however, the torsion experienced by each of the transducers 180a and 180b are unequal in magnitude by virtue of their unequal vertical separation, namely $d_1$ and $d_3$, from the side load F. However, since $((d_1+d_3)/2)=d_2$, the net electrical impact experienced by the "split" transducers 180a, 180b is equal in magnitude to that experienced by strain gage 182. Thus, when the strain gages are wired in either of the bridge configurations shown in FIGS. 4A and 4B, the circuit will be balanced and the output of the circuit is zero volts.

As illustrated in FIG. 3B, the torsional force T acts about the axis A of the coil. A configuration is shown in FIG. 1B wherein the applied torsion can be measured. Like the previously described arrangements, the torsion measuring strain gages 184, 186 are arranged in diametrically opposed fashion. Moreover, the strain gages may be mounted along the outside diameter of the coil 20 as shown in FIG. 1B, or along the inside diameter of the coil as shown in FIG. 2B.

However, unlike the previously described embodiments, each of the two transducers comprising each strain gage 184, 186 have grid elements 185 which are positioned perpendicular and parallel to a neutral axis of the coil to measure the compression or tension along the coil. The transducers are coupled in a bridge circuit arrangement such as those shown in FIGS. 4A and 4B, where the complimentary transducers (i.e. T1 and T2 and C1 and C2) are coupled on opposing legs of the bridge. The resulting output voltage is proportional to the magnitude of the torsional force T (FIG. 3B), and the sign of the output represents the direction of the torsional force.

It turns out that the torsion measuring strain gages 184, 186 are insensitive to axial loading. Thus, a general torsional load cell can be constructed simply by providing the gages 184, 186 as shown in FIG. 1B. Thus, strain gage 186 consists of transducer elements 186a and 186b, each having grid elements 185 formed on a substrate. The transducers 186a, 186b are positioned so that the grid elements are respectively in parallel and perpendicular relation to the neutral axis 40 of the coil 10. Diametrically opposed strain gage 184 is similarly constructed.

Alternatively, the torsion measuring strain gages can be used to enhance the performance of the various embodiments of helical load cells shown in FIG. 1A. Specifically, signals out of the helical load cells which employ strain gages disposed along the outside diameter or the inside diameter of the coil 20 contain an error term due to sensitivity to torsional loading. By incorporating a set of torsion measuring strain gages 184, 186 on the coil, it is possible to remove this torsion error, either in an analog manner or digitally.

Figure 4D:
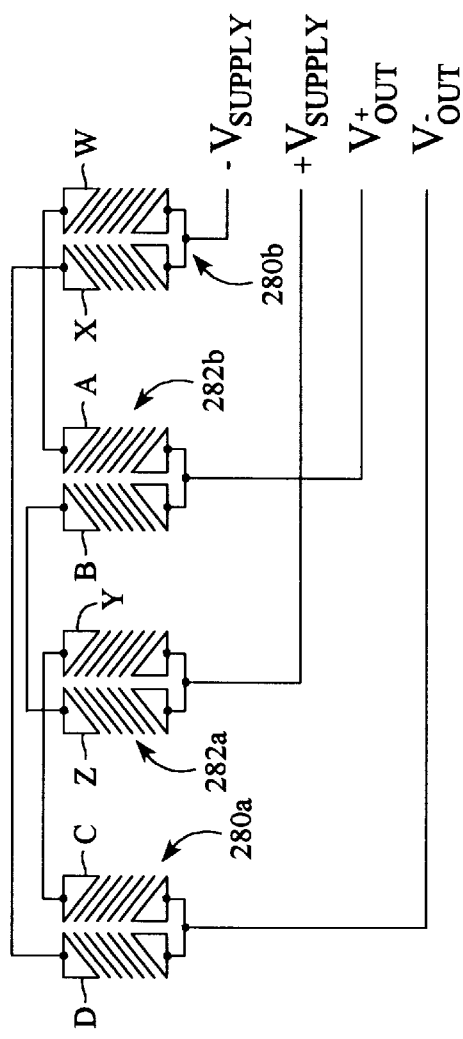
Figure 4D:
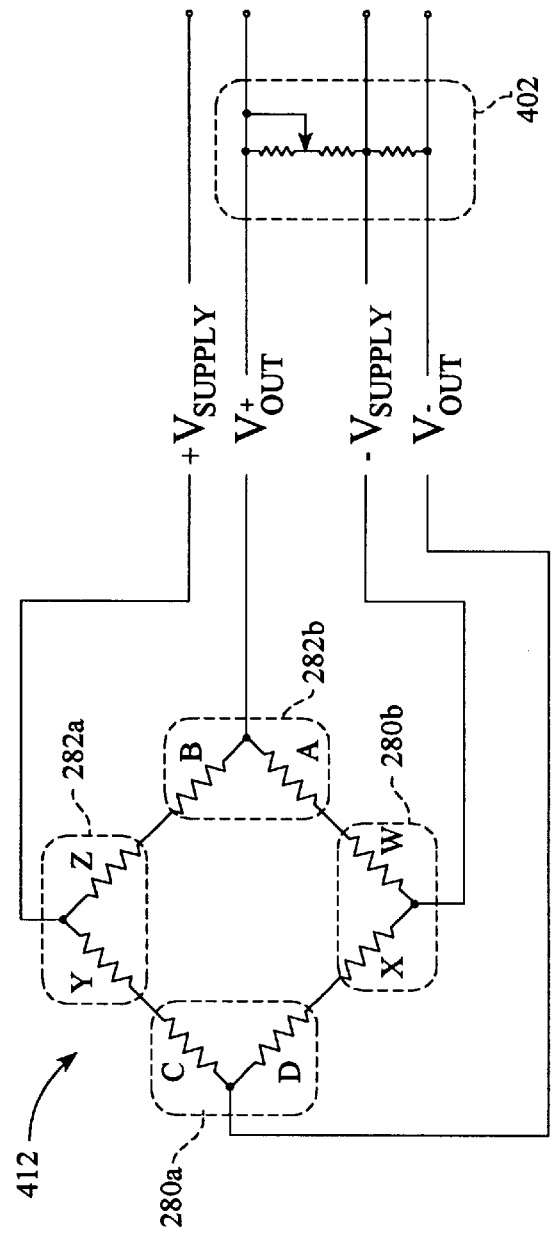

Turn now to FIG. 1C for yet another configuration of the helical load cell. FIG. 1C shows a "split" configuration involving sets of strain gage modules in a manner similar to the "split" pair configuration of FIG. 1B. However, unlike FIG. 1B where a strain gage 180 was split into its component transducer elements 160, 162, the embodiment of FIG. 1C uses pairs of strain gages. A proximate pair of gages 282 consisting of strain gage 282a and strain gage 282b is provided on a first pitch P1 of the coil. The other pair of strain gages 280 is shown "split" across pitches P2 and P3. In addition, the split gages 280a, 280b are disposed in diametrically opposed relation to the proximate pair 282. While the embodiment of FIG. 1C shows the gages being mounted upon the outside diameter of the coil, the gages can instead be placed along the inside diameter as illustrated in FIG. 2B. The gages are coupled in accordance with the bridge circuit 412, shown in FIG. 4D. A trimmer circuit 402 may be used to zero-balance the bridge circuit, or the gages may be trimmed by any of several methods well known in the art.

Figure 2E:
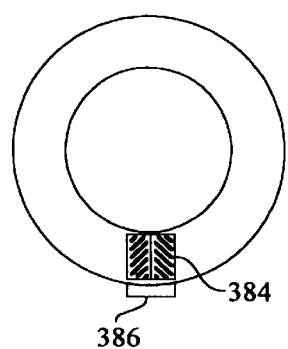

FIG. 1C also shows a "single-point" configuration helical load cell, comprised of strain gages 384, 386. In this embodiment, strain gage 386 is disposed along an outside diameter of the coil. Proximate to gage 386 is strain gage 384 disposed upon a top surface of the coil. FIG. 2E shows the arrangement of gages 384, 386 from a top view looking down. It is noted that gage 386 can be positioned along the outside diameter or the inside diameter of the coil, and that gage 384 can be position on the top or the bottom surface of the coil. This embodiment has the advantage of being a low cost-to-manufacture device. The gages can be fabricated as a single unit, including the bridge circuit wiring. Unlike in the other embodiments where the bridge circuit wiring must be run from one side of the helix to the other, this embodiment places the gages at the same "point" along the helix thus simplifying the wiring process.

The side-mounted gage 386 is sensitive to both torsional and shear stresses, while the top-mounted gauge 384 is sensitive only to torsional stress. Thus, by subtracting out the torsion force, the gage-pair 384, 386 can be used to provide a measure of the shear force acting on the load cell. The bridge circuitry appropriate for the "single-point" configuration, therefore, is the subtractive bridge shown in FIG. 4C. It is observed that the torsional force is always higher than the shear force, and that by subtracting out the torsion the load cell is less responsive than in the other configurations. This embodiment, therefor is most appropriate in those cases where off-axis loading is low and high sensitivity is not required, but where cost is a dominant factor.

During testing of the various embodiments of helical load cells, it has been observed that the "split" configuration 280, 282 shown in FIG. 1C displayed the best performance, as compared to either the split configuration shown in FIG. 1B or the "single-point" configuration of FIG. 1C. Testing is performed by placing the load cell off-axis at various points along the circumference of the helix, and measuring the resultant output with respect to the actual load. With 2000 pound loading at any point around the circumference of the coil, the split configuration of FIG. 1C exhibited a maximum error of 6 pounds, or 0.3%. This is compared with 5% for the configuration in FIG. 1B and 20% for the single-point configuration of FIG. 1C. The FIG. 1C split configuration provides a load cell of sufficient sensitivity as to be considered "gauge" quality. On the other hand, the FIG. 1C split configuration is the most costly to manufacture, requiring a total of four strain gage transducers and a complicated bridge circuit wiring scheme; while the single-point configuration in FIG. 1C is the lowest cost embodiment. The various embodiments, therefore, make available helical load cells which span the full range of the cost-performance spectrum.

Figure 5A:
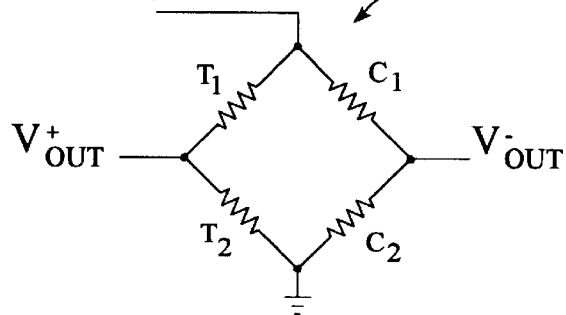
Figure 5A:
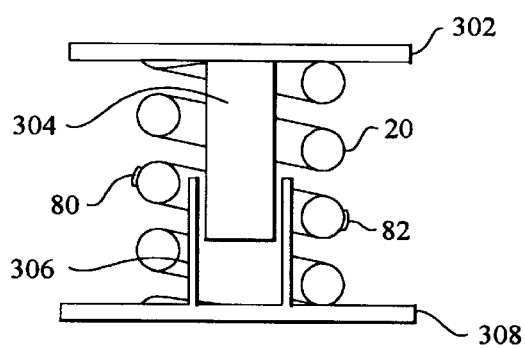
Figure 5B:
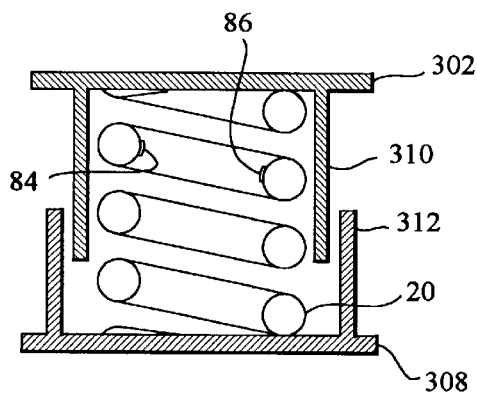

Various applications of a helical load cell constructed in accordance with the present invention will now be described with reference to FIGS. 5A–5C and 6–10. FIG. 5A shows a load bearing platform 302 having a rod 304 coupled thereto which slidably fits into a tube member 306 anchored to a base member 308. The rod and tube portions fit through the center of a helical coil 20 which supports the platform 302. In this configuration, the strain gage modules 80, 82 are located along the periphery of the outside diameter of the coil, since the inside diameter-mounted strain gages would likely be crushed between the inside periphery of the coil and the rod 304. FIG. 5B shows a configuration which permits the use of inside diameter strain gage modules 84, 86. In this configuration, the platform 302 includes an inner tube member 310 into which the coil 20 fits. The inner tube 310 slidably fits into an outer tube member 312 which is anchored to the base 308.

The configurations of FIGS. 5A and 5B are also adaptable to the surface mounted embodiments of the helical load cell, where the transducers are located on the upper and/or lower surfaces of the coil 20 (see FIG. 1A). The length(s) of the rod 302 and/or tube members 306, 310, 312 can be extended so that the coil cannot reach a fully compressed condition. In this way, the surface mounted transducers will avoid being crushed by a compressive load which would fully compress the coil.

Figure 5C:
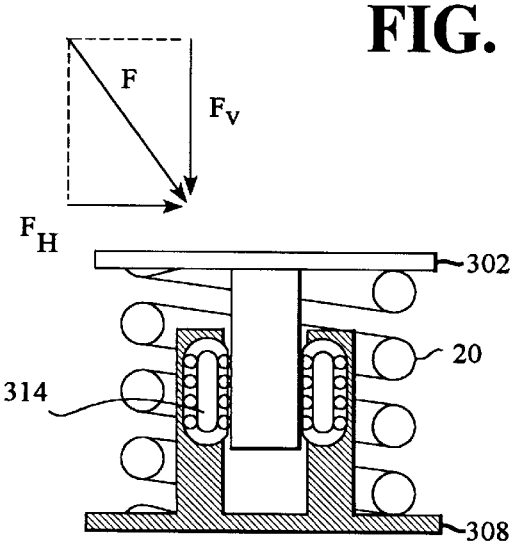

FIG. 5C shows the use of linear ball bearings 314 placed in the tube 306 to provide lateral support in high side loading applications. The linear ball bearings serve to minimize frictional forces between the rod 304 and the tube 306. In this case, the vertical force component $F_v$ is measured, while the horizontal force component $F_h$ is absorbed by the bearings. An application for such a high side-force load is in the construction of a hydraulic clamp used for lifting an object whose weight needs to be measured. An example would be a garbage container clamp where the horizontal clamping force which grips the container can be separated from the weight of the container.

Figure 6:
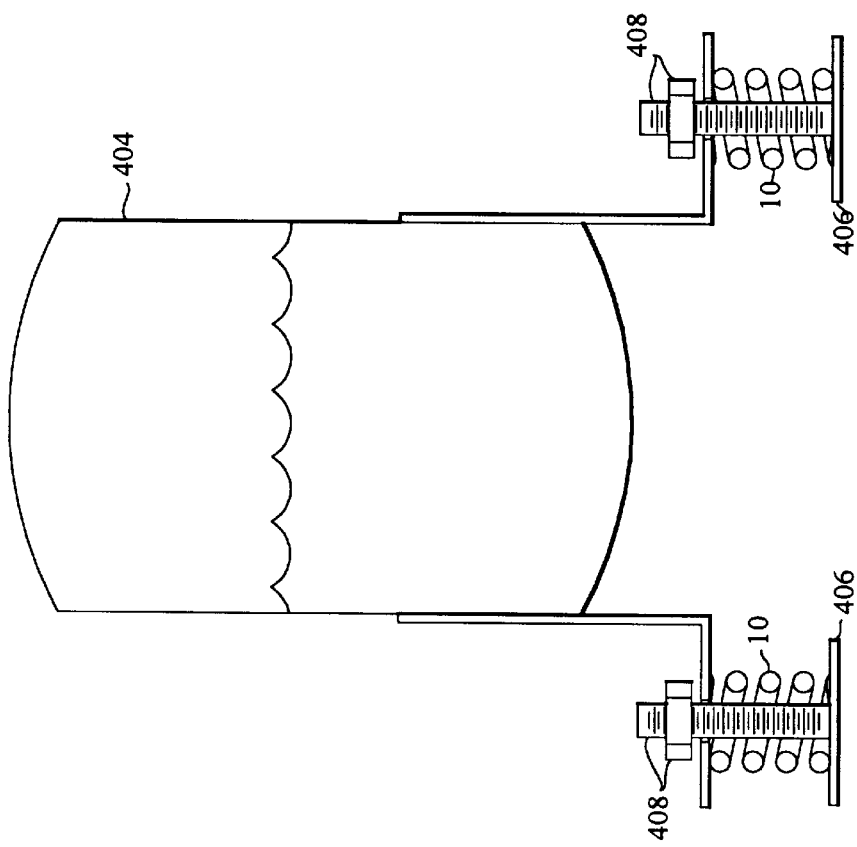

Turn now to FIG. 6 for another use of the helical load cell 10 of the invention. In chemical processing situations, corrosive chemicals sometimes need to be transported, stored and utilized. This is particularly true in the manufacture of semiconductor integrated circuits. One chemical utilized in this field is hydrofluoric acid HF used for etching semiconductor wafers. HF is highly reactive and is used hot. The tanks and tubing used to fill and drain them are usually made of Teflon or other nonreactive material, since any reactive substances will corrode, fail, and contaminate the acid. Commercially available level sensors exist which are used within the tank to monitor the level. However, such sensors are quite expensive. The helical load cell of the present invention provides a viable alternative to such sensors.

As can be seen in FIG. 6, a chemical tank 402 having mounting brackets 404 is supported by helical load cells 10 upon a base 406 and held in place by retaining nuts and bolts 408. The weight of the tank and its contents are then easily determined by monitoring the output of the load cells 10. Since the helical load cells are insensitive to loading conditions, existing chemical tanks can easily be re-fitted without expensive modifications.

Figure 7:
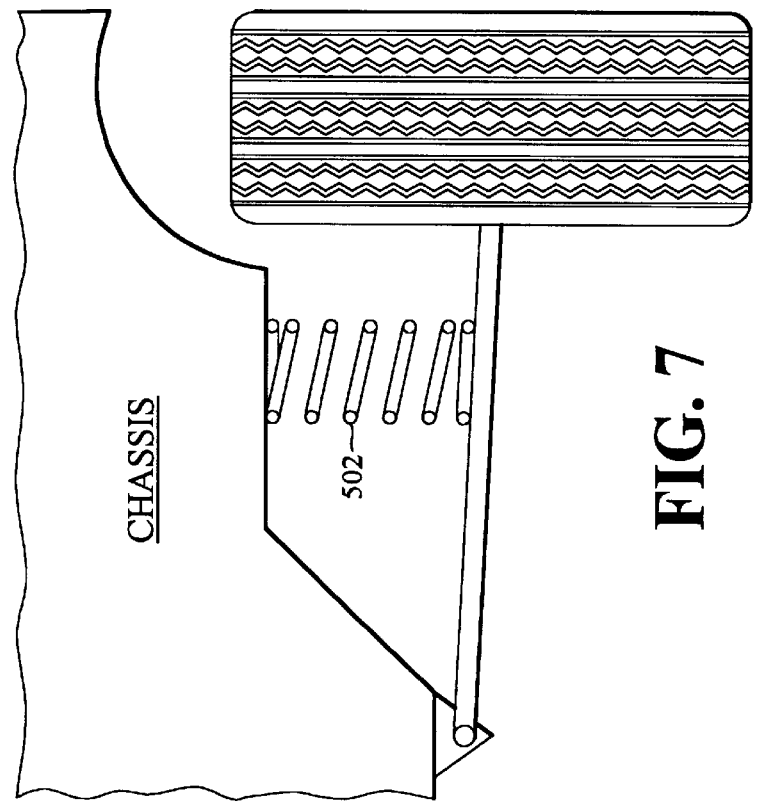

Refer to FIG. 7 for another application of the present invention. Many vehicles have suspension systems which utilize a coiled spring as opposed to leaf springs. FIG. 7 shows that such coil springs 502 can be readily converted to a helical load cell by placing transducers on them in accordance with the present invention. This is especially useful in the case of race cars having suspensions consisting of wound helical springs at all four wheels. Converting such springs to helical load cells allows real-time measurements to be taken by an on-board data acquisition system, allowing the race team mechanics to optimize the car's handling characteristics.

Figure 8A:
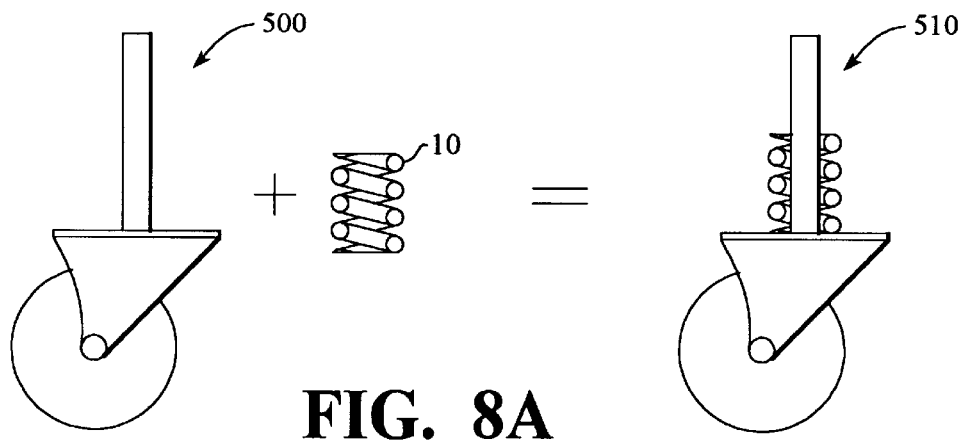
Figure 8B:
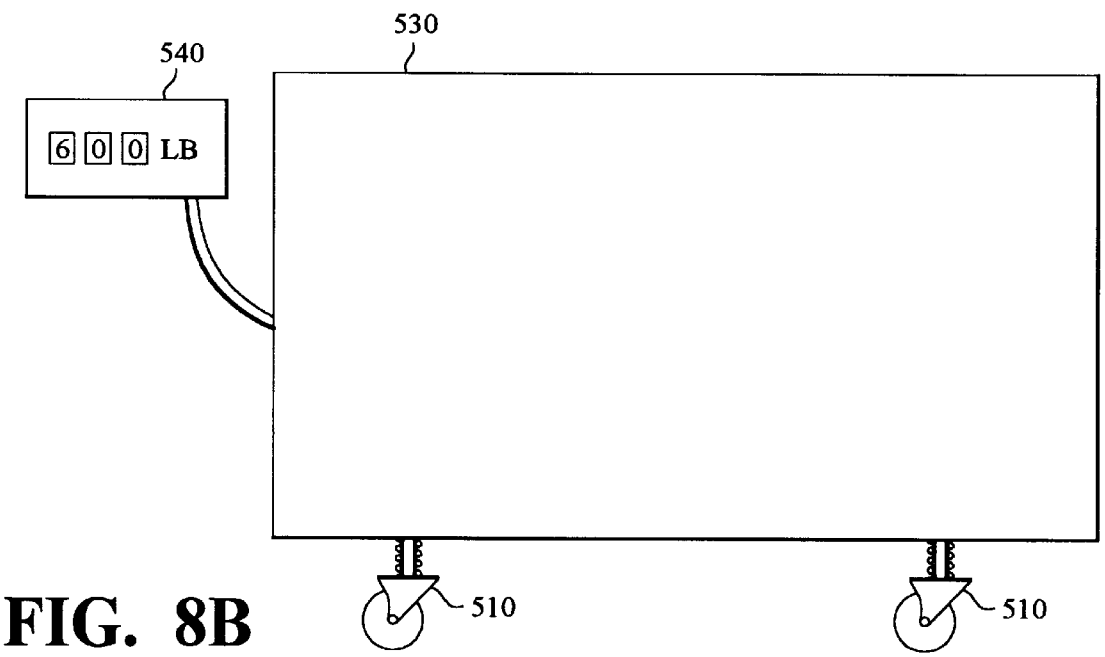

FIG. 8 shows yet another application of a helical load cell 10. Stem casters 500 are wheels which can be added to any container to make that container portable. FIG. 8 shows that a helical load cell 10 can be easily added to a caster and the combination 510 placed on a dumpster 530, for example. The addition of a digital readout device 540 effectively and inexpensively converts that dumpster to a scale. This is especially useful for dumpsters which hold recyclable materials. The scale can be used to weigh each load placed in the dumpster for the purpose of paying the contributor.

Figure 9:
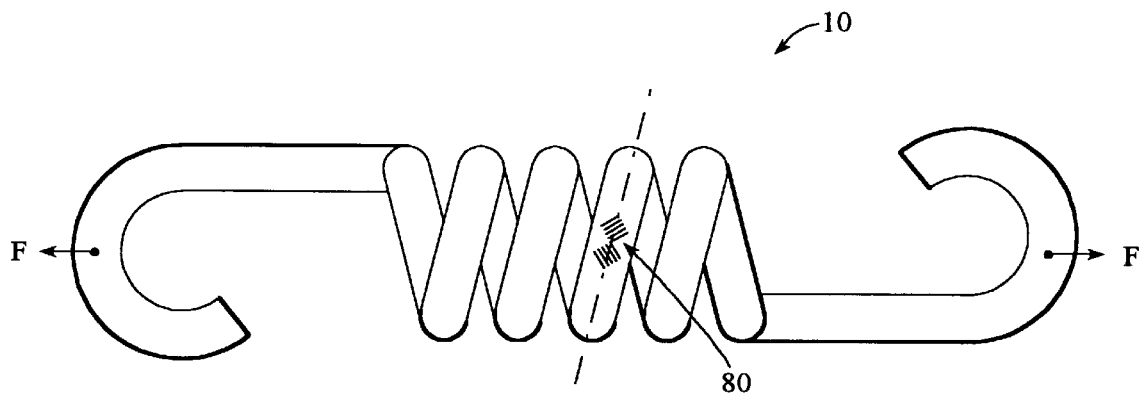

FIG. 9 shows that a helical load cell 10 can operate in tension as well as measure compressive loads. The transducers 60, 62 which comprise each of the strain gage modules 80, 82 behave in the same manner under tensile loads as under compressive loads.

FIG. 10A shows an application of the helical load cell in connection with automobile seats. Considerable attention is being devoted to the development of airbag systems for automobiles which are inherently safer than current systems.

A problem that has been identified is that the explosive force of deployment required to safely arrest the motion of a large adult may not be appropriate for adults of diminutive stature or children. Much discussion has centered around the creation of "smart" airbag systems that would moderate or inhibit airbag deployment based on the weight of the occupant of the vehicle seat protected by the airbag. Currently, no suitable technology exists to accurately measure the seat occupant's weight at a reasonable cost.

FIGS. 10A and 10B show a low cost weight sensor for a vehicle seat utilizing the helical load cell of the present invention. The system 600 is compatible with the form factor and adjustment parameters of standard auto seats. A helical load cell 10 is placed between a base plate or frame 604 of the seat and a seat plate 602 which holds a foam pad 606. The helical load cell 10 replaces a sheet metal framework which is used in current seat systems to couple the plate 602 to the base 604. The base is free to move on rollers 608 to permit adjustment of the seat. The load cell 10 is oriented so that the axis of the coil portion 20 is vertical, thus measuring only vertical forces and not horizontal forces. The entire assembly is then covered in fabric.

Since the helical load cell is capable of measuring the total downward force present on the seat plate, regardless of the manner or load distribution of that weight, the occupant size and seating orientation has no affect on the measured weight. Deflection of the seat under load, and the compliance of the seat to forces away from the center of the spring may be adjusted by the thickness of the wire, the diameter of the coil, and the total number of turns in the load cell. For example, a coil made from ⅝ inch diameter wire wound to a diameter of two inches results in a load cell which deflects about 0.05 inches when impressed with a 200 pound force. With two active turns of the wire, this coil also appears to have sufficient stiffness so as not to have excessive compliance when the seat is loaded off-center, such as when the occupant is sitting on the front edge of the seat. Alternatively, an arrangement of four load cells placed at the corners of the seat can be used to provide additional stiffness.

Another embodiment of the automobile seat incorporates a helical load cell 20 having an arrangement of four strain gage modules, such as the arrangement of modules 80–83 shown in FIG. 1A. The top view of FIG. 10B shows the orientation of the strain gage modules. The modules 80, 82 are arranged laterally, facing the side doors of the automobile. These strain gage modules are coupled in an additive type of bridge circuit, such as those shown in FIGS. 4A and 4B. These modules provide a measure of the weight of the seat occupant, independently of how the occupant is seated.

The modules 81, 83 are arranged front to rear, and are coupled in a subtractive type of bridge, such as shown in FIG. 4C. These modules provide a signal that is combined with the signal provided by modules 80, 82 to give a measure of how far forward or rearward the occupant is seated relative to the central axis A of the helical load cell 20.

This is an especially useful aspect of the helical load cell as used in an automobile seat. Airbag safety systems can be greatly enhanced to provide additional safety in connection with children's car seats. An automobile seat enhanced with a helical load cell in accordance with the fourth embodiment of the invention can detect whether the child's car seat is facing forward or rearward. At the same time, an accurate measurement of the weight of the child and the child's car seat is provided, even though the car seat and child are not centered over the central axis of the helical load coil; i.e. the child and the seat represent an off-axis load to the load coil.

We claim:

1. A load cell comprising:
   a helical coil;
   first force sensing means disposed upon the coil;
   second force sensing means disposed upon the coil and positioned substantially at 180 degrees relative to the first force sensing means; and
   a bridge circuit coupling the first and second force sensing means;
   whereby an output of the bridge circuit is indicative of a load experienced by the load cell.

2. The load cell of claim 1 wherein:
   the first force sensing means includes a first transducer and a second transducer disposed proximate the first transducer, the first and second transducers being disposed along a first neutral axis of the coil; and
   the second force sensing means includes a third transducer disposed upon a pitch of the coil above that of the first force sensing means and further including a fourth transducer disposed upon a pitch of the coil below that of the first force sensing means.

3. The load cell of claim 2 wherein the first force sensing means is equidistant from the third and fourth transducers.

4. The load cell of claim 2 wherein all of the transducers are disposed along either an outside diameter of the coil or along an inside diameter of the coil.

5. The load cell of claim 2 wherein each of the transducers is disposed upon an upper surface of the coil or upon a bottom surface of the coil.

6. The load cell of claim 5 further including a compression stop member to prevent the helical coil from becoming fully compressed.

7. The load cell of claim 2 wherein each of the transducers is a strain gage device comprising a substrate having a first plurality of parallel grid elements and a second plurality of parallel grid elements in substantially orthogonal relation to the first plurality of grid elements.

8. The load cell of claim 7 wherein each of the transducers is disposed upon the coil such that its grid elements lie at substantially 45 degrees relative to its corresponding neutral axis.

9. The load cell of claim 2 wherein each of the transducers comprises a substrate having a single set of grid elements arranged in parallel fashion thereon, the first and second transducers arranged such that their respective grid elements lie in substantially orthogonal relation to each other.

10. The load cell of claim 9 wherein each of the transducers is disposed upon the coil such that its single set of grid elements lie at substantially 45 degrees relative to its corresponding neutral axis.

11. The load cell of claim 1 wherein the first and second force sensing means each includes a first grid of strain elements and a second grid of strain elements in substantially orthogonal relation to the first grid, the first and second force sensing means are respectively disposed relative to first and second neutral axes of the coil such that the first and second grids of each force sensing means are respectively positioned parallel and orthogonal to the corresponding neutral axis.

12. A load cell comprising:

a helical coil;

a first transducer disposed on the helical coil;

a second transducer disposed on a pitch of the helical coil separate from that of the first transducer, and in vertical alignment with the first transducer;

a third transducer disposed on a pitch of the helical coil between those of the first and second transducers, and in diametrically opposed relation to the first and second transducers; and a fourth transducer disposed proximate the third transducer, and oriented substantially ninety degrees relative to the third transducer;

the third and fourth transducers being equidistant from the first and second transducers.

13. The load cell of claim 12 wherein each of the transducers is disposed upon an upper or a bottom surface of the helical coil.

14. The load cell of claim 13 further including a compression stop member to prevent the helical coil from becoming fully compressed.

15. The load cell of claim 12 wherein each of the transducers is a strain gage device having a substrate having a first plurality of strain gage elements disposed thereupon and a second plurality of strain gage elements disposed orthogonal to the first strain gage elements.

16. The load cell of claim 12 wherein each of the transducers comprises a substrate having a single set of parallel strain gage elements disposed thereupon.

17. A load cell comprising:

a helical coil;

a first pair of transducers mounted along a first neutral axis of the coil, each of the first transducers having a plurality of grid elements, each of the first transducers being arranged in perpendicular relation to each other and positioned relative to the first neutral axis such that the grid elements of one of the first transducers are parallel to the neutral axis and the grid elements of the other are perpendicular to the neutral axis;

a second pair of transducers mounted along a second neutral axis of the coil, each of the second transducers having a plurality of grid elements, each of the second transducers being arranged in perpendicular relation to each other and positioned relative to the second neutral axis such that the grid elements of one of the second transducers are parallel to the neutral axis and the grid elements of the other are perpendicular to the neutral axis; and a bridge circuit coupling the first and second transducers;

the first transducers being disposed in diametrically opposed relation to the second transducers.

18. The load cell of claim 17 wherein the transducers either are disposed upon an outside diameter of the coil or disposed upon an inside diameter of the coil.

19. The load cell of claim 17 further including a third pair of transducers, a fourth pair of transducers mounted on the coil, and a second bridge circuit coupling the third and fourth pairs, the third pair diametrically opposed the fourth pair, transducers of each of the third and fourth pairs having grid elements aligned at forty-five degrees relative to a neutral axis of the coil.

20. A load cell comprising:

a helical coil;

a first strain gage device disposed upon either an outside or an inside diameter of the coil;

a second strain gage device disposed upon either an upper or a lower surface of the coil, and proximate the first transducer means; and a bridge circuit coupling the first strain gage device to the second strain gage device.

* * * * *